(12) United States Patent
Yen et al.

(10) Patent No.: US 7,491,379 B2
(45) Date of Patent: Feb. 17, 2009

(54) METHOD FOR PRODUCING NANO-SCALE θ-PHASE ALUMINA MICROPARTICLES

(75) Inventors: Fu-Su Yen, Tainan (TW); Rung-Je Yang, Kaohsiung County (TW)

(73) Assignee: National Cheng Kung University, Tainan (TW)

( * ) Notice: Subject to any disclaimer, the term of this patent is extended or adjusted under 35 U.S.C. 154(b) by 385 days.

(21) Appl. No.: 11/384,832

(22) Filed: Mar. 21, 2006

(65) Prior Publication Data

US 2006/0233698 A1    Oct. 19, 2006

(30) Foreign Application Priority Data

Mar. 21, 2005    (TW) .............................. 94108673 A

(51) Int. Cl.
*C01F 7/02*    (2006.01)
(52) U.S. Cl. ...................................... 423/625; 423/628
(58) Field of Classification Search ................ 423/625, 423/629, 628
See application file for complete search history.

(56) References Cited

U.S. PATENT DOCUMENTS

| | | | |
|---|---|---|---|
| 3,714,343 A * | 1/1973 | Sato et al. ................... | 423/628 |
| 5,698,483 A | 12/1997 | Ong et al. | |
| 6,048,577 A | 4/2000 | Garg | |
| 6,203,768 B1 | 3/2001 | McCormick et al. | |
| 6,503,475 B1 | 1/2003 | McCormick et al. | |
| 6,521,016 B2 | 2/2003 | Kim et al. | |
| 6,761,866 B1 | 7/2004 | James et al. | |
| 2006/0104895 A1 * | 5/2006 | Bauer et al. ................. | 423/625 |

* cited by examiner

*Primary Examiner*—Wayne Langel
*Assistant Examiner*—James Fiorito

(57) ABSTRACT

A method for producing nano-scale theta (θ)-phase alumina microparticles is disclosed. The nano-scale θ-phase alumina microparticles are uniform in particle size and highly phase-pure. They are obtained by controlling the ratio of boehmite mixed with the θ-phase alumina initial powders, followed by at least one phase transformation. Therefore, the nano-scale θ-phase alumina microparticles produced by the present method have more uniform particle size and highly purer phase. As such for the production of nano-scale θ-phase alumina microparticles, the present method saves more process time and cost, and it provides an advantage such as the clean production.

21 Claims, 7 Drawing Sheets

METHOD FOR PRODUCING NANO-SCALE θ-PHASE ALUMINA MICROPARTICLES

RELATED APPLICATIONS

The present application is based on, and claims priority from, Taiwan Application Serial Number 94108673, filed Mar. 21, 2005, the disclosure of which is hereby incorporated by reference herein in its entirety.

FIELD OF THE INVENTION

The present invention relates to a method for producing nano-scale theta (θ)-phase alumina microparticles, and more particularly, to a method for producing nano-scale θ-phase alumina microparticles with uniform particle size and highly pure phase.

BACKGROUND OF THE INVENTION

Alumina ($Al_2O_3$) is one of the most popular ceramic materials in a diverse array of industrial applications and above all, nano-scale alumina powder exhibits many advantages, such as high surface area, low sintering temperature and excellent toughness, so it can be applied in sintered monolith, catalyst carriers, composite material fillers, paints, and even chemical mechanical polishing solutions. Thus, alumina has become an essential material in the modern industry.

There are many conventional methods for producing metal oxide powder, for example, directly smashing and grinding method, solid state reaction method, thermal decomposition method and so on. Such methods are characterized by smashing and grinding powder, and then sieving out the powder with specific particle size. For example, the solid state reaction method, which is applied maturely in the industry, is employed to mixing the material powder well, and the material powder is subjected to a thermal treatment to become a desired powder compound. After grinding and sieving the powder compound, the required powder with the desired particle size is obtained. However, those processes have the common bottleneck, for example, when the powder has the thinner particle size, it is more difficult to be grinded and brings more severe pollution during processing. Therefore, with respect to the powder having high purity or less than submicron scale, grinding steps are decreased in the recent process, such as the chemical method or the physicochemical method. In the chemical method, the required particle size is obtained by controlling the crystallite growth during the chemical precipitation process. In the physicochemical method, the required particle size is controlled by the physicochemical process.

The industrial alumina powder is mainly composed of a-phase alumina powder, which is obtained by thermally treating θ-phase alumina and transforming its phase. Bauxite the mixture of diaspore [AlO(OH)], gibbsite [$Al(OH)_3$] and boehmite (AlOOH) called in the mineralogy serves as the starting material for producing the α-phase alumina powder. Aluminum hydroxide [$Al(OH)_3$] crystal is then obtained after the mixture is dissolved and precipitated. Subsequently, the precipitated $Al(OH)_3$ crystal is calcined to form alumina coarse-grained powder. The alumina coarse-grained powder is smashed and sieved to form various grades of industrial alumina powders.

In the thermal decomposition process, the α-phase alumina is mostly obtained by calcining the aluminum hydroxide, in which the calcinations temperature requires about 1000 degrees Celsius (° C.) to 1200° C. However, the aluminum hydroxide is subjected to dehydration and a series of phase transformations before obtaining the α-phase alumina. Below about 900° C., the χ-, η-, γ- and ρ-phases occur, and between about 900° C. and about 1150° C., δ-, κ- and θ-phases occur. Each transition phase mentioned as above depends on isomers of the aluminum hydroxide crystal. Finally, the α-phase alumina occurs. Among those, the θ-phase alumina powder is indeed the former transition phase of the α-phase alumina powder produced by the boehmite, so the process of the θ-phase alumina powder is the same as the α-phase alumina powder except for the process of the θ-phase alumina powder is carried out at lower temperature. However, more accompanying alumina transition phases present at the temperature as θ-phase alumina powder occurs, and they are difficult to be removed, resulting that it is complicated to obtain purer or single-phase θ-phase alumina powder. Therefore, the process cost is increased, and the θ-phase alumina powder is rarely applied in the industry.

All above the aforementioned description, there are many prior technologies to make efforts in solving the above problems. For example, U.S. Pat. No. 5,698,483 discloses a process for producing nano size powders comprising the steps of mixing an aqueous continuous phase comprising at least one metal cation salt with a hydrophilic organic polymeric disperse phase, forming a metal cation salt/polymer gel, and heat treating the gel at a temperature sufficient to drive off water and organics within the gel, leaving as a residue a nanometer particle-size powder.

U.S. Pat. No. 6,503,475 discloses a process for the production of ultrafine powders that includes subjecting a mixture of precursor metal compound and a non-reactant diluent phase to mechanical milling whereby the process of mechanical activation reduces the microstructure of the mixture to the form of nano-sized grains of the metal compound uniformly dispersed in the diluent phase. The process also includes heat treating the mixture of nano-sized grains of the metal compound uniformly dispersed in the diluent phase to convert the nano-sized grains of the metal compound into a metal oxide phase. The process further includes removing the diluent phase such that the nano-sized grains of the metal oxide phase are left behind in the form of an ultrafine powder.

U.S. Pat. No. 6,203,768 discloses a process for the production of ultrafine particles, which is based on mechanically activated chemical reaction of a metal compound with a suitable reagent. During mechanical activation a composite structure is formed which consists of an intimate mixture of nano-sized grains of the nano-phase substance and the reaction by-product phase. The step of removing the by-product phase, following mechanical activation, may involve subjecting the composite structure to a suitable solvent which dissolves the by-product phase, while not reacting with the solid nano-phase substance. The process according to the invention may be used to form ultrafine metal powders as well as ultrafine ceramic powders. Advantages of the process include a significant degree of control over the size and size distribution of the ultrafine particles, and over the nature of interfaces created between the solid nano-phase substance and the reaction by-product phase.

U.S. Pat. No. 6,521,016 discloses a method of producing nanophase Cu—$Al_2O_3$ composite powder by means of 1) the producing precursor powders by centrifugal spray drying process using the water base solution, in which Cu-nitrate ($Cu(NO_3)_2$ $3H_2O$) and Al-nitrate ($Al(NO_3)_3$ $9H_2O$) are solved to the point of final target composition (Cu-1 wt %/$Al_2O_3$), 2) the heat treatment process (desaltation process) at the 850 degrees C. for 30 min in air atmosphere to remove the volatile components such as the moisture and $NO_3$ group in precursor powder and simultaneously to synthesize the nano CuO—Al$_2$O$_3$ composite powders by the oxidation of corresponded metal components and 3) the reduction heat treatment of CuO at 200 degrees C. for 30 min in reducing atmosphere to produce the final nanophase Cu—Al$_2$O$_3$ composite powders with the size below 20 nm.

U.S. Pat. No. 6,761,866 discloses a single step process for the synthesis of nanoparticles of phase pure ceramic oxides of a single or a multi-component system comprising one or more metal ions. The process comprises preparing a solution containing all the required metal ions in stoichiometric ratio by dissolving their respective soluble salts in an organic solvent or in water, preparing a precursor, adjusting the nitrate/ammonia content in the system, and heating the system.

U.S. Pat. No. 6,048,577 discloses nano-sized powders of alpha alumina can be obtained from a boehinite gel doped with a barrier-forming material such as silica that is then dried, fired and comminuted to powder form.

In a summary of the aforementioned methods, a substance different from the desired product is reacted by the chemical reaction or the mechanical strength to be a well dispersive precursor such as boehmite alumina, and the precursor is subjected to dehydration and phase transformation under a high temperature and/or a high pressure condition, so as to produce various aluminum oxide powders. However, such powders produced by the above methods have uneven particle sizes, and they still contain a certain amount of other transition phases, such as δ- or γ-phases. If it is desired to obtain purer or single-phase θ-phase alumina powder, the process is very complicated, and the cost is increased, too.

The θ-phase alumina is formed at the temperature lower than α-phase alumina, and is more stable to heat than α-phase alumina. Moreover, the θ-phase alumina has higher specific surface area ranging from 80 m$^2$/g to 150 m$^2$/g. Furthermore, the θ-phase alumina possesses less specific surface area decline under high temperature than the δ- or γ-phase alumina powders. Based on the above advantages, the θ-phase alumina will be more beneficially applied to the development of the high-temperature catalyst material than the δ- and γ-phase alumina powders in the future. Hence, there is a need for developing a method for producing nano-scale and highly pure θ-phase alumina microparticles, so as to overcome the problems of uneven particle sizes and less phase purity in the prior process.

SUMMARY OF THE INVENTION

It is an aspect of the present invention to provide a method for producing nano-scale θ-phase alumina microparticles, which controls the ratio of boehmite mixed with the θ-phase alumina initial powders, followed by at least one phase transformation, so as to form nano-scale θ-phase alumina microparticles with uniform particle size and highly pure phase. Therefore, the nano-scale θ-phase alumina microparticles produced by the present method have more uniform particle size and highly purer phase. As such for the production of nano-scale θ-phase alumina microparticles, the present method saves more process time and cost, and it provides an advantage such as the clean production.

According to the aforementioned aspect of the present invention, there is provided a method for producing nano-scale θ-phase alumina microparticles. At first, a θ-phase alumina initial powder and boehmite are mixed well, in which the boehmite has 5 percent to 70 percent by weight of an alumina equivalent, so as to form an uniform alumina mixed powder. Next, the alumina mixed powder is heated to a first temperature and kept at the first temperature for a first period, so as to trigger a phase transformation of the alumina mixed powder for forming α'-phase alumina microparticles with a crystal size less than 100 nanometers (nm). After the α'-phase alumina microparticles are quenched to room temperature and then heated to a second temperature, or directly quenched to the second temperature, the α'-phase alumina microparticles are subjected to the thermal treatment at the second temperature and kept for a second period, so as to trigger another retrogression to form nano-scale θ-phase alumina microparticles, wherein a diameter of the resultant nano-scale θ-phase alumina microparticles is in a range from 30 nm to 150 nm (wherein the crystal size of the θ-phase alumina is less than 100 nm).

Preferably, the second temperature is less than the first temperature. The first temperature may be in a range from 600° C. to 1200° C., and the second temperature may be in a range from 500° C. to 900° C.

Preferably, a diameter of the resultant nano-scale θ-phase alumina microparticles is in a range from 30 nm to 50 nm. Alternatively, the diameter of the resultant nano-scale θ-phase alumina microparticles is in a range from 50 nm to 150 nm.

The method for producing nano-scale θ-phase alumina microparticles controls the ratio of boehmite mixed with the θ-phase alumina initial powders, followed by at least one phase transformation, so as to form nano-scale θ-phase alumina microparticles with uniform particle size and highly pure phase. Therefore, the nano-scale θ-phase alumina microparticles produced by the present method have more uniform particle size and highly purer phase. As such for the production of nano-scale θ-phase alumina microparticles, the present method saves more process time and cost, and it provides an advantage such as the clean production.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1A:
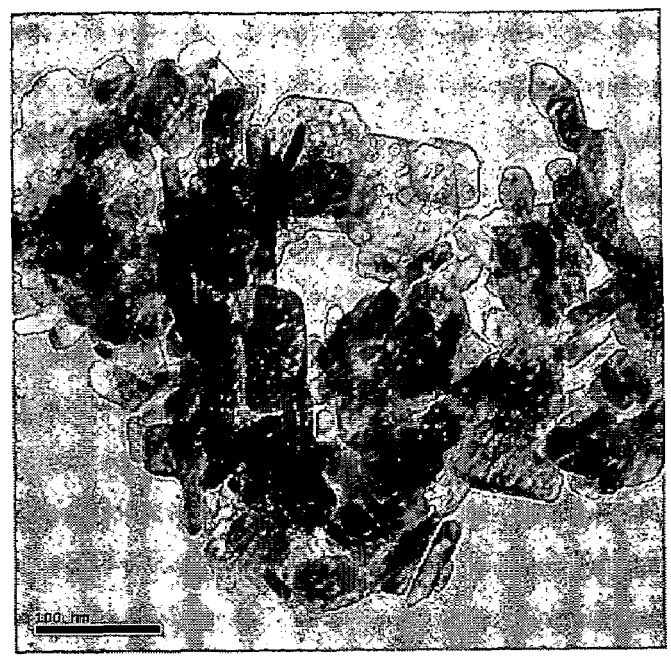
FIGS. 1A to 1B depict TEM pictures of the untreated industrial θ-phase alumina powder.

The present invention provides a method for producing nano-scale θ-phase alumina microparticles, which controls the ratio of boehmite mixed with the θ-phase alumina initial powders, followed by at least one phase transformation, so as to form nano-scale θ-phase alumina microparticles with uniform particle size and highly pure phase. Hereinafter, the method for producing nano-scale θ-phase alumina microparticles of the present invention is more explicitly and completely clarified in the following description.

At first, an alumina mixed powder is provided as a starting material. The alumina mixed powder comprises θ-phase alumina powder and boehmite, wherein an amount of the θ-phase alumina powder in the alumina mixed powder is in a range from 30 percent to 95 percent by weight, and an alumina equivalent of the boehmite in the alumina mixed powder is in a range from 5 percent to 70 percent by weight. Next, the alumina mixed powder is mixed well and heated to a first temperature and kept at the first temperature for a first period, for example, kept at the first temperature ranging from 600° C. to 1200° C. for 1 to 10 minutes, so as to trigger a first phase transformation of the alumina mixed powder.

After the first period expires, the alumina mixed powder is immediately quenched to room temperature and then heated to a second temperature, or it is directly quenched to the second temperature. However, instable α'-phase alumina powder is not completely transformed to α-phase alumina microparticles, wherein the α'-phase alumina microparticles show a nano-scale crystalline with a crystal size less than 100 nm, and have a particle diameter ranging from 30 nm to 150 nm. And then, the α'-phase alumina microparticles are heated to the second temperature below the first temperature and kept for a second period, for example, kept at the second temperature ranging from 500° C. to 900° C. for 1 to 10 minutes, so as to trigger a second phase transformation, for example, a retrogression occurs on the α'-phase alumina microparticles for forming the nano-scale θ-phase alumina microparticles. In the second phase transformation, a single θ-phase alumina crystalline is transformed by a single α'-phase alumina crystalline, so the resultant nano-scale θ-phase alumina microparticles have less variation in particle size, for example, from 30 to 150 nm. In an exemplary embodiment, the resultant nano-scale θ-phase alumina microparticles is directly transformed by the α'-phase alumina monocrystallites, so their particle size is in a range from 30 nm to 50 nm. In another exemplary embodiment, the resultant nano-scale θ-phase alumina microparticles is in a range from 50 nm to 150 nm.

In an exemplary embodiment of the present invention, the steps of heating the alumina mixed powder and heating the α'-phase alumina microparticles are both performed at a heating rate higher than 50° C. per minute, and the step of quenching the α'-phase alumina mixed powder is performed at a cooling rate higher than 50° C. per minute.

It is worth mentioning that the present invention is characterized by controlling the ratio of boehmite mixed with the θ-phase alumina initial powders, followed by at least one phase transformation, so as to form nano-scale θ-phase alumina microparticles with uniform particle size and highly pure phase. The phase purity of the nano-scale θ-phase alumina microparticles is more than approximately 90 percent by weight, and the particle size of the nano-scale θ-phase alumina microparticles is in a range from 30 nm to 50 nm and/or in another range from 50 nm to 150 nm, thereby overcoming the problems of uneven particle size, less phase purity, high cost and chemical waste solutions during the prior chemical process. Moreover, the nano-scale θ-phase alumina microparticles have a specific surface area ranging from 80 $m^2/g$ to 150 $m^2/g$, and they possess less specific surface area decline under high temperature than the δ- or γ-phase alumina microparticles. Accordingly, the nano-scale θ-phase alumina microparticles will be more beneficially applied to the high-temperature catalyst material than the δ- and γ-phase alumina microparticles in the future.

Hereinafter, the method for producing nano-scale θ-phase alumina microparticles of the present invention is more explicitly clarified in following preferred embodiments, when taken in conjunction with FIGS. 1A to 7. However, the embodiments are merely given to illustrate various applications of the invention rather than to be interpreted as limiting the scope of the appended claims.

COMPARATIVE EXAMPLE

At first, the particle size and the phase identification of the untreated industrial θ-phase alumina powder are evaluated by a transmission electron microscopy (TEM) and a X-ray diffraction (XRD) system, respectively. In EXAMPLES of the present invention, the scanning speed of the XRD system is 4° per minute, and the scanning angle (2θ°) of which is in a range from 20° to 80°.

Figure 1B:
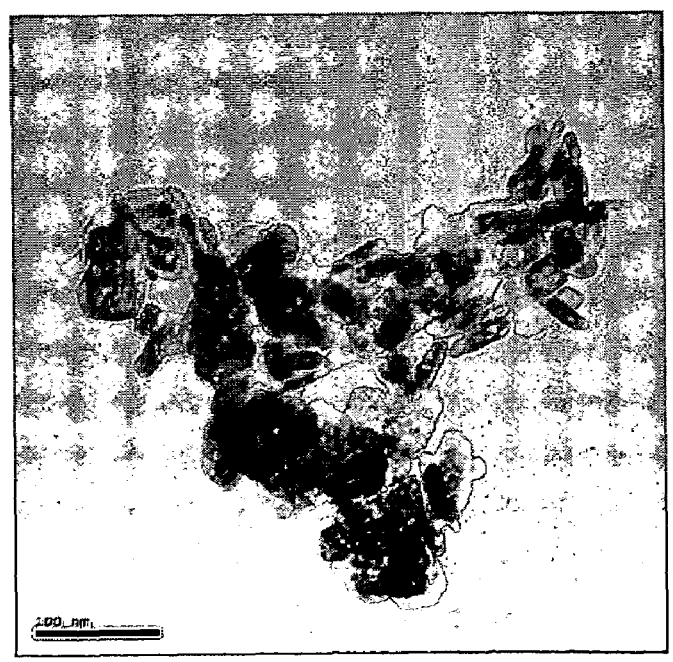
Figure 2:
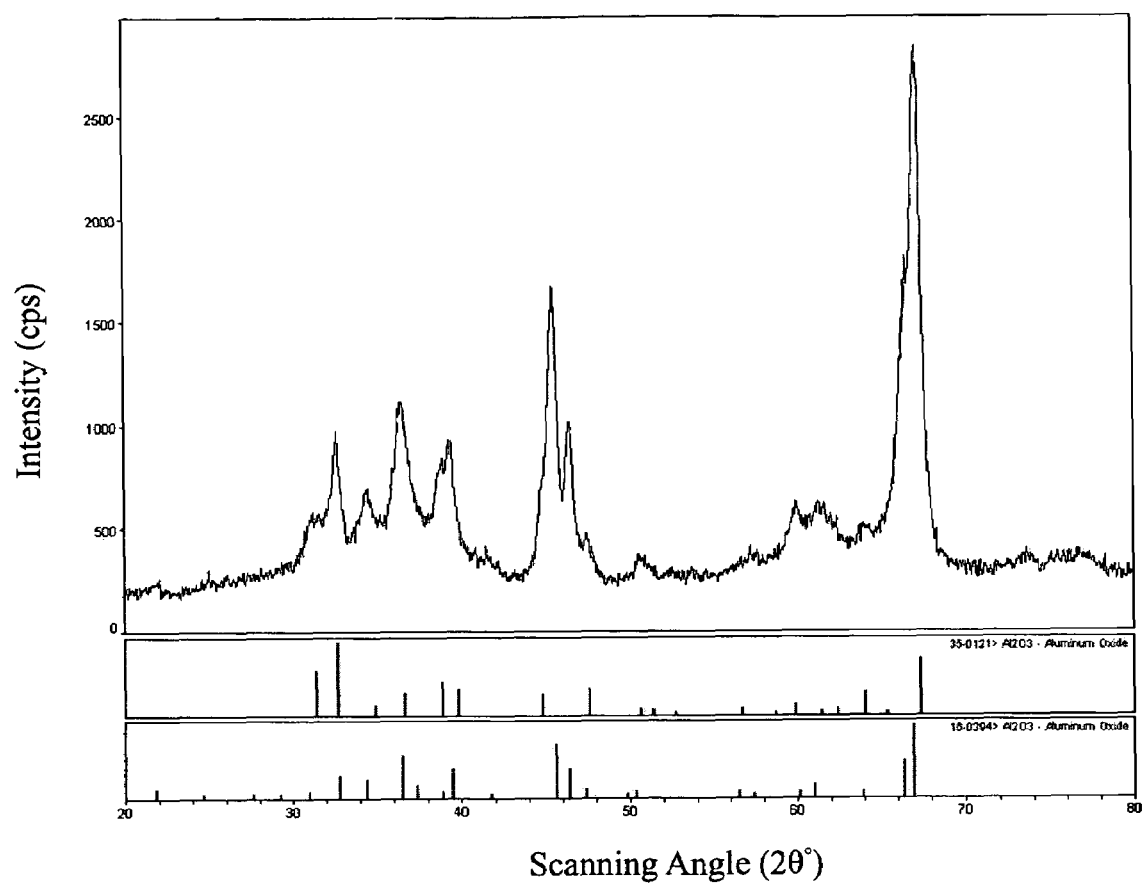
FIG. 2 depicts an XRD pattern of the untreated industrial θ-phase alumina powder.

Reference is made to FIGS. 1A and 1B, which depict TEM pictures of the untreated industrial θ-phase alumina powder, wherein its particle size is in a range from about 15 nm to 100 nm. Reference is made to FIG. 2, which depicts an XRD pattern of the untreated industrial θ-phase alumina powder, wherein the vertical axis refers to the intensity (counts per second; cps) of X-rays, and the horizontal axis refers to the scanning angle (2θ°). In the result of the phase identification in FIG. 2, the untreated industrial θ-phase alumina powder is substantially composed of θ- and δ-phase alumina powders.

Figure 3:
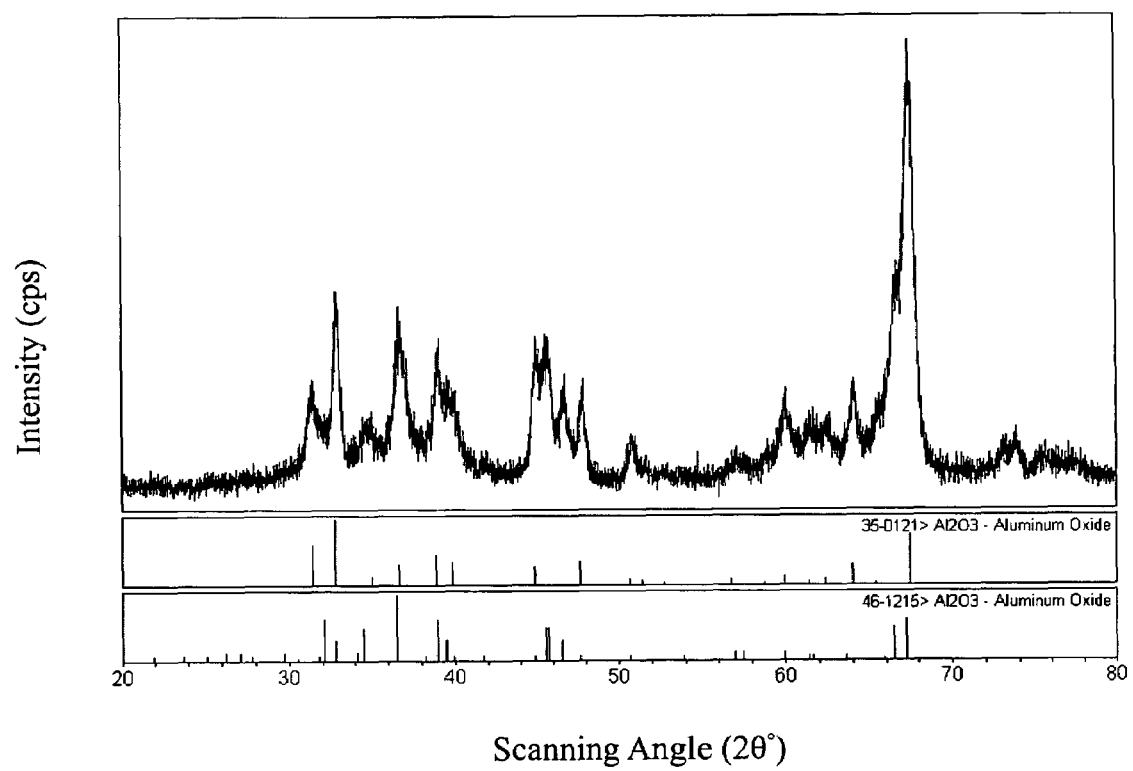
FIG. 3 depicts an XRD pattern of the treated industrial θ-phase alumina powder.

After the aforementioned evaluation, the industrial θ-phase alumina powder serves as a starting material, and it is heated up to 1100° C. at a heating rate higher than 50° C. per minute, kept at 1100° C. for 2 minutes, and immediately quenched to room temperature. And then, the resultant alumina powder is further heated up to 500° C. at a heating rate higher than 50° C. per minute, kept at 500° C. for 2 minutes, and the phase identification of the resultant alumina powder is immediately examined by the XRD system. Reference is made to FIG. 3, which depicts an XRD pattern of the treated industrial θ-phase alumina powder, wherein the vertical axis refers to the intensity (cps) of X-rays, and the horizontal axis refers to the scanning angle (2θ°). In the result of the phase identification in FIG. 3, even if the ratio of θ- and δ-phase alumina has been vaired, the resultant product of the thermal treatment that uses the industrial θ-phase alumina powder as the only starting materialis still substantially composed of θ- and δ-phase alumina powders.

EXAMPLE 1

At first, a mixture of about 95 percent of the industrial θ-phase alumina powder and about 5 percent boehmite by weight serving as starting materials, is heated up to 1000° C. at a heating rate higher than 50° C. per minute, kept at 1000° C. for 3 minutes, and immediately quenched to room temperature. And then, the resultant alumina microparticles are further heated up to 800° C. at a heating rate higher than 50° C. per minute, kept at 800° C. for 2 minutes, so as to obtain nano-scale θ-phase alumina microparticles. And then, the same TEM and the XRD system as COMPARATIVE EXAMPLE are employed to examine the particle size and the phase identification with respect to the resultant nano-scale θ-phase alumina microparticles.

Figure 4A:
FIGS. 4A to 4B depict TEM pictures of the resultant nano-scale θ-phase alumina microparticles according to the EXAMPLE 1 of the present invention.
Figure 4B:
Figure 5:
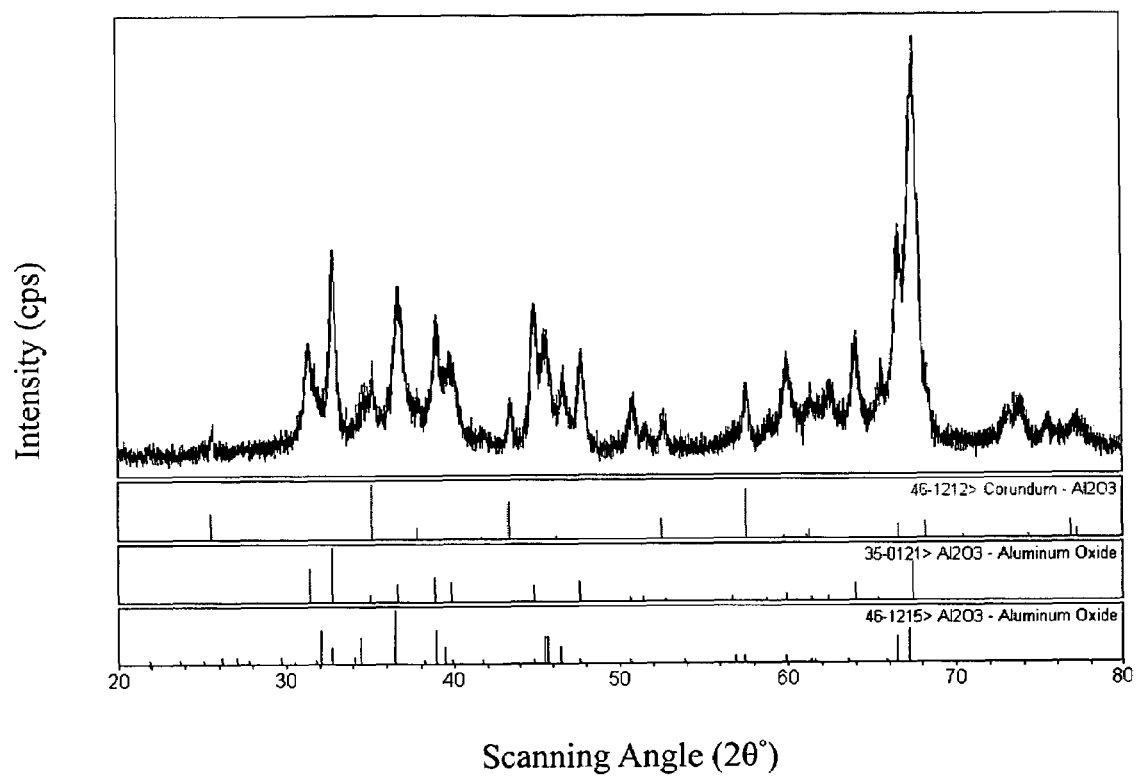
FIG. 5 depicts an XRD pattern of the nano-scale θ-phase alumina microparticles according to the EXAMPLE 1 of the present invention.

Reference is made to FIGS. 4A and 4B, which depict TEM pictures of the resultant nano-scale θ-phase alumina microparticles according to the EXAMPLE 1 of the present invention, wherein FIG. 4A is a bright field image of a single θ-phase alumina crystallite and FIG. 4B is a dark field image thereof. In the result of FIGS. 4A and 4B, the nano-scale θ-phase alumina microparticles of EXAMPLE 1 have the uniform particle size ranging from 30 nm to 50 nm. Moreover, reference is made to FIG. 5, which depicts an XRD pattern of the nano-scale θ-phase alumina microparticles according to the EXAMPLE 1 of the present invention, wherein the vertical axis refers to the intensity (cps) of X-rays, and the horizontal axis refers to the scanning angle (2θ°). In the result of the phase identification in FIG. 5, the nano-scale θ-phase alumina microparticles of the EXAMPLE 1 are substantially composed of a major θ-phase alumina powder, a minor α-phase alumina powder, and additionally mixed with little δ-phase alumina powders.

EXAMPLE 2

At first, a mixture of about 44 percent of the industrial θ-phase alumina powder and about 56 percent boehmite by weight serving as starting materials, is heated up to 1200° C. at a heating rate higher than 50° C. per minute, kept at 1200° C. for 4 minutes, and immediately quenched to room temperature. And then, the resultant alumina microparticles are further heated up to 700° C. at a heating rate higher than 50° C. per minute, kept at 700° C. for 3 minutes, so as to obtain nano-scale θ-phase alumina microparticles.

Figure 6A:
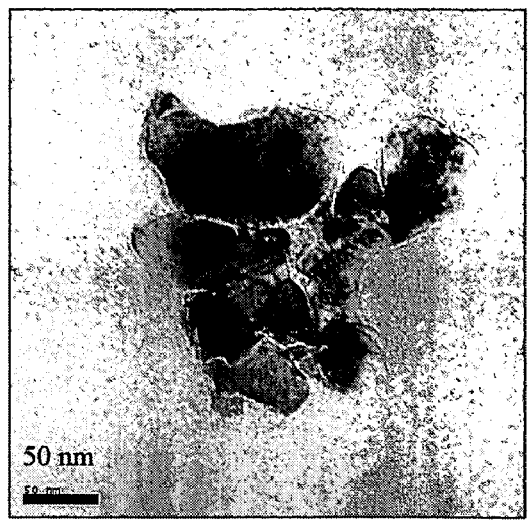
FIGS. 6A to 6B depict TEM pictures of the resultant nano-scale θ-phase alumina microparticles according to the EXAMPLE 2 of the present invention.
Figure 6B:
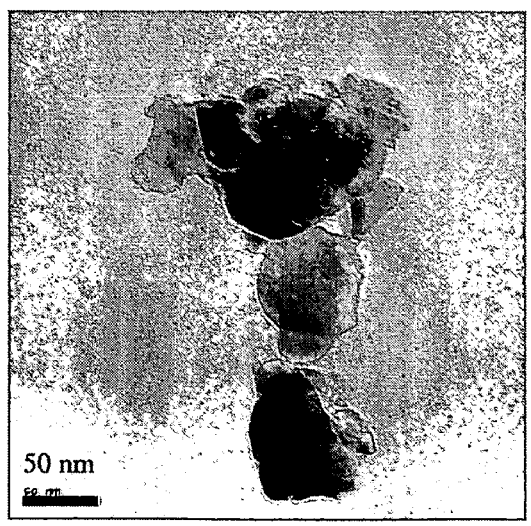
Figure 7:
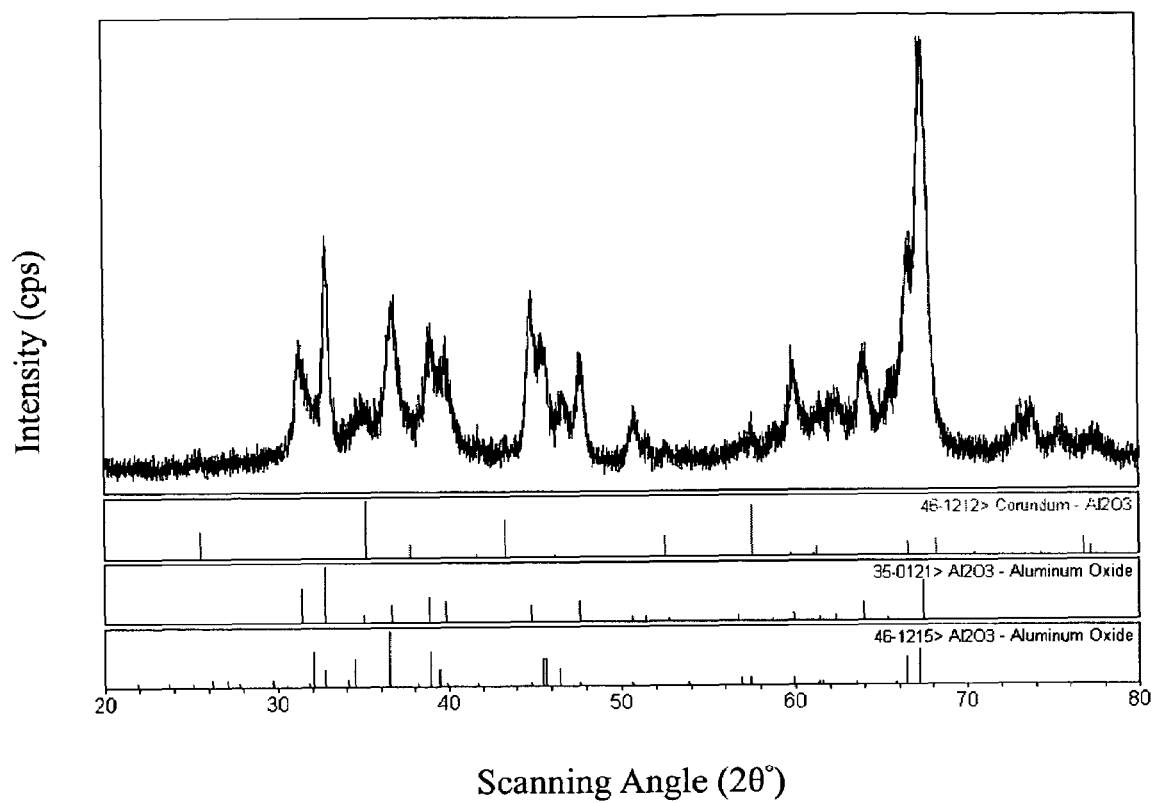
FIG. 7 depicts an XRD pattern of the nano-scale θ-phase alumina microparticles according to the EXAMPLE 2 of the present invention.

And then, the same TEM and the XRD system as COMPARATIVE EXAMPLE are employed to examine the particle size and the phase identification with respect to the resultant nano-scale θ-phase alumina microparticles. Reference is made to FIGS. 6A and 6B, which depict TEM pictures of the resultant nano-scale θ-phase alumina microparticles according to the EXAMPLE 2 of the present invention. In the result of FIGS. 6A and 6B, the nano-scale θ-phase alumina microparticles of EXAMPLE 2 have the uniform particle size ranging from 50 nm to 150 nm. Moreover, reference is made to FIG. 7, which depicts an XRD pattern of the nano-scale θ-phase alumina microparticles according to the EXAMPLE 2 of the present invention, wherein the vertical axis refers to the intensity (cps) of X-rays, and the horizontal axis refers to the scanning angle (2θ°). In the result of the phase identification in FIG. 7, the nano-scale θ-phase alumina microparticles of the EXAMPLE 2 are substantially composed of a major θ-phase alumina powders, and additional mixed with little α- and δ-phase alumina powders.

EXAMPLE 3

At first, a mixture of about 44 percent of the industrial θ-phase alumina powder and about 56 percent boehinite by weight serving as starting materials, is heated up to 1150° C. at a heating rate of 10° C. per minute, kept at 1150° C. for 10 minutes, immediately quenched to 700° C. and kept at 700° C. for 4 minutes, so as to obtain nano-scale θ-phase alumina microparticles.

And then, the same TEM and the XRD system as COMPARATIVE EXAMPLE are employed to examine the particle size and the phase identification with respect to the resultant nano-scale θ-phase alumina microparticles. The resultant nano-scale θ-phase alumina microparticles of EXAMPLE 3 have the uniform particle size ranging from 50 nm to 150 nm. The nano-scale θ-phase alumina microparticles of the EXAMPLE 3 are substantially composed of a major θ-phase alumina powders, and additional mixed with little α- and δ-phase alumina powders.

EXAMPLE 4

At first, a mixture of about 40 percent of the industrial θ-phase alumina powder and about 60 percent boehmite by weight serving as starting materials, is heated up to 1150° C. at a heating rate of 20° C. per minute, kept at 1150° C. for 10 minutes, immediately quenched to 800° C., and kept at 800° C. for 4 minutes, so as to obtain nano-scale θ-phase alumina microparticles.

And then, the same TEM and the XRD system as COMPARATIVE EXAMPLE are employed to examine the particle size and the phase identification with respect to the resultant nano-scale θ-phase alumina microparticles. The resultant nano-scale θ-phase alumina microparticles of EXAMPLE 4 have the uniform particle size ranging from 50 nm to 150 nm. The nano-scale θ-phase alumina microparticles of the EXAMPLE 4 are substantially composed of a major θ-phase alumina powders, and additional mixed with little α- and δ-phase alumina powders.

In brief, the method for producing nano-scale θ-phase alumina microparticles of the present invention is characterized by controlling the amount of boehmite added with the θ-phase alumina initial powders and the temperature during the phase transformation, so as to form nano-scale θ-phase alumina microparticles with specific particle size. Accordingly, the present method not only overcomes the problems of uneven particle size, less phase purity, high cost and chemical waste solutions during the prior chemical process, but also produces the nano-scale θ-phase alumina microparticles having uniform particle size and highly pure phase. All above description is the benefit of the method for producing nano-scale θ-phase alumina microparticles of the present invention beyond the prior process.

According to the aforementioned preferred embodiments, one advantage of the method for producing nano-scale θ-phase alumina microparticles, which controls the ratio of boehmite mixed with the θ-phase alumina initial powders, followed by at least one phase transformation, so as to form nano-scale θ-phase alumina microparticles with uniform particle size and highly pure phase. Therefore, the nano-scale θ-phase alumina microparticles produced by the present method have more uniform particle size and highly purer phase. As such for the production of nano-scale θ-phase alumina microparticles, the present method saves more process time and cost, and it provides an advantage such as the clean production.

As is understood by a person skilled in the art, the foregoing preferred embodiments of the present invention are illustrated of the present invention rather than limiting of the present invention. It is intended to cover various modifications and similar arrangements included within the spirit and scope of the appended claims. Therefore, the scope of which should be accorded the broadest interpretation so as to encompass all such modifications and similar structure.

What is claimed is:

1. A method for producing nano-scale theta (θ)-phase alumina microparticles, comprising:

providing an alumina mixed powder, the alumina mixed powder comprises θ-phase alumina powder and boehmite, wherein an amount of the θ-phase alumina powder in the alumina mixed powder is in a range from 30 percent to 95 percent by weight, and an alumina equivalent of the boehmite in the alumina mixed powder is in a range from 5 percent to 70 percent by weight;

heating the alumina mixed powder to a first temperature and keeping it at the first temperature for a first period, so as to trigger a first phase transformation of the alumina mixed powder for forming α'-phase alumina microparticles; and quenching the α'-phase alumina microparticles to room temperature and heating it to a second temperature and keeping it at the second temperature for a second period, so as to trigger at least a second phase transformation of the α'-phase alumina microparticles for forming the nano-scale θ-phase alumina microparticles, wherein a particle size of the nano-scale θ-phase alumina microparticles is in a range from 30 nanometers (nm) to 150 nm, and a phase purity of the nano-scale θ-phase alumina microparticles is more than approximately 90 percent by weight.

2. The method for producing nano-scale θ-phase alumina microparticles according to claim 1, wherein the step of heating the alumina mixed powder is performed at a heating rate higher than 50 degrees Celsius per minute.

3. The method for producing nano-scale θ-phase alumina microparticles according to claim 1, wherein the first temperature is in a range from 600 degrees Celsius to 1200 degrees Celsius.

4. The method for producing nano-scale θ-phase alumina microparticles according to claim 1, wherein the first period is in a range from 1 minute to 10 minutes.

5. The method for producing nano-scale θ-phase alumina microparticles according to claim 1, wherein the step of quenching the alumina mixed powder is performed at a cooling rate higher than 50 degrees Celsius per minute.

6. The method for producing nano-scale θ-phase alumina microparticles according to claim 1, wherein the step of heating the α'-phase alumina microparticles is performed at a heating rate higher than 50 degrees Celsius per minute.

7. The method for producing nano-scale θ-phase alumina microparticles according to claim 1, wherein the second temperature is less than the first temperature.

8. The method for producing nano-scale θ-phase alumina microparticles according to claim 1, wherein the second temperature is in a range from 500 degrees Celsius to 900 degrees Celsius.

9. The method for producing nano-scale θ-phase alumina microparticles according to claim 1, wherein the second period is in a range from 1 minute to 10 minutes.

10. The method for producing nano-scale θ-phase alumina microparticles according to claim 1, wherein a particle size of the nano-scale θ-phase alumina microparticles is in a range from 30 nm to 50 nm.

11. The method for producing nano-scale θ-phase alumina microparticles according to claim 1, wherein a particle size of the nano-scale θ-phase alumina microparticles is in a range from 50 nm to 150 nm.

12. A method for producing nano-scale θ-phase alumina microparticles, comprising:
providing an alumina mixed powder, the alumina mixed powder comprises θ-phase alumina powder and boehmite, wherein an amount of the θ-phase alumina powder in the alumina mixed powder is in a range from 30 percent to 95 percent by weight, and an alumina equivalent of the boehmite in the alumina mixed powder is in a range from 5 percent to 70 percent by weight;

heating an alumina mixed powder to a first temperature and keeping it at the first temperature for a first period, so as to trigger a first phase transformation of the alumina mixed powder for forming α'-phase alumina microparticles; and quenching the alumina mixed powder to a second temperature and keeping it at the second temperature for a second period, so as to trigger at least a second phase transformation of the α'-phase alumina microparticles for forming the nano-scale θ-phase alumina microparticles, wherein a particle size of the nano-scale θ-phase alumina microparticles is in a range from 30 nm to 150 nm, and a phase purity of the nano-scale θ-phase alumina microparticles is more than approximately 90 percent by weight.

13. The method for producing nano-scale θ-phase alumina microparticles according to claim 12, wherein the step of heating the alumina mixed powder is performed at a heating rate higher than 50 degrees Celsius per minute.

14. The method for producing nano-scale θ-phase alumina microparticles according to claim 12, wherein the first temperature is in a range from 600 degrees Celsius to 1200 degrees Celsius.

15. The method for producing nano-scale θ-phase alumina microparticles according to claim 12, wherein the first period is in a range from 1 minute to 10 minutes.

16. The method for producing nano-scale θ-phase alumina microparticles according to claim 12, wherein the step of quenching the alumina mixed powder is performed at a cooling rate higher than 50 degrees Celsius per minute.

17. The method for producing nano-scale θ-phase alumina microparticles according to claim 12, wherein the step of heating the α'-phase alumina microparticles is performed at a heating rate higher than 50 degrees Celsius per minute.

18. The method for producing nano-scale θ-phase alumina microparticles according to claim 12, wherein the second temperature is in a range from 500 degrees Celsius to 900 degrees Celsius.

19. The method for producing nano-scale θ-phase alumina microparticles according to claim 12, wherein the second period is in a range from 1 minute to 10 minutes.

20. The method for producing nano-scale θ-phase alumina microparticles according to claim 12, wherein a diameter of the nano-scale θ-phase alumina microparticles is in a range from 30 nm to 50 nm.

21. The method for producing nano-scale θ-phase alumina microparticles according to claim 12, wherein a diameter of the nano-scale θ-phase alumina microparticles is in a range from 50 nm to 150 nm.

* * * * *